D. CAMINO.
COFFEE POT.
APPLICATION FILED MAR. 29, 1911.
1,125,812.
Patented Jan. 19, 1915.
Fig. 1.
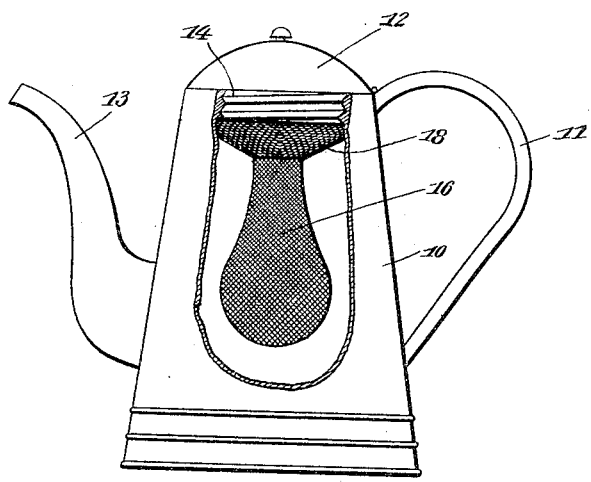
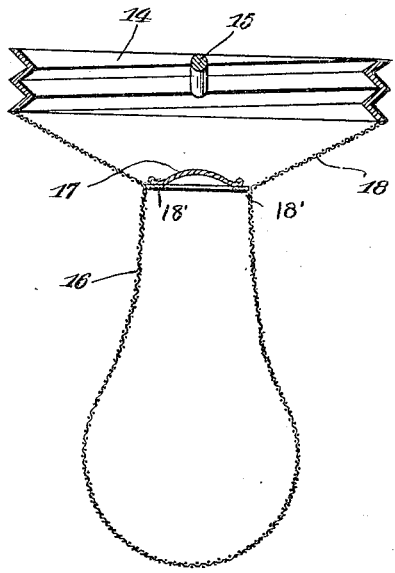
Fig. 2.
Witnesses
J. H. Crawford
P. A. Hoster
Inventor
Duchess Camino,
By Victor J. Evans
Attorney

UNITED STATES PATENT OFFICE.

DUCHESS CAMINO, OF NEW YORK, N. Y.

COFFEE-POT.

1,125,812. Specification of Letters Patent. Patented Jan. 19, 1915.

Application filed March 29, 1911. Serial No. 617,572.

*To all whom it may concern:*

Be it known that I, DUCHESS CAMINO, a citizen of the United States, residing at New York, in the county of New York and State of New York, have invented new and useful Improvements in Coffee-Pots, of which the following is a specification.

An object of the invention is to provide a device for conveniently preparing coffee and other beverages therein.

For the purpose mentioned, use is made of a pot provided with a spout and having a cover thereon and a strainer removably mounted in said pot, the upper end of the strainer being adapted for connection with the upper end of the pot so that the strainer will depend in the pot.

Reference is to be had to the accompanying drawings constituting a part of this specification, in which similar characters of reference denote corresponding parts in all the views, and in which—

Figure 1 is a side elevation of my coffee pot, parts being broken away to disclose the underlying structure. Fig. 2 is a longitudinal sectional view of the strainer of my coffee pot.

Referring more particularly to the views, I employ a pot 10 having a handle 11 and provided with a cover 12 mounted to swing on the upper end of the pot, the said pot being also provided with a suitable spout 13. The upper end of the spout is threaded to receive a circular body 14 provided with screw threads on the outer periphery thereof and having a handle 15 disposed transversely to the strainer with the ends of the handle connected to the inner side of the strainer, as shown in Fig. 2. A strainer 16, in the form of a mesh bag, has its lower portion thereof of a globular shape and serves as a container for coffee and the like. A closure 17 is hingedly mounted on a ring 18' and is adapted to close the upper end of the strainer 16 relatively to the body 14 as will be seen in Fig. 2. The closure 17 consists of a concavo-convexed disk having its convexity merging in a direction toward the walls of the sieve 18, and by the pivotal connection of the closure with the top surface of the ring 18' permits the said closure to be supported by the interior surface of the walls of the sieve when the closure is in an opened position. The body portion 14 is carried by the upper edge of the sieve 18, the function of which will be later described.

It will be noted from the description so far offered by me, I term the member 16 a strainer, but desire it to be understood, that the said strainer 16 is in the form of a container, and upon the opening of the nonperforated closure 17, a predetermined quantity of ground coffee is deposited in the strainer 16, a predetermined quantity of fluid, preferably water, is then deposited on top of the ground coffee, and the closure 17 is then closed. It will further be observed from the structure, reference being had more particularly to Fig. 2 of the drawing, wherein is shown the closure 17 of a concavo-convexed form, that said closure being non-perforated and disposed wholly within and above the filling opening of the strainer 16, permits the water poured within the sieve 18 to contact with the closure 17 and be deflected in a direction toward the walls of the coffee pot 10, and in a direction away from the strainer 16 preventing the water from entering the strainer 16 in a non-filtered condition.

In use the body 14 is connected with the upper portion of the pot 10, the strainer 16 being disposed in depending position in the pot, and the ground coffee is poured into the strainer 16, said body being then filled with water. By referring to Fig. 2, it will be seen that when the closure 17 is in closed position and water is poured into the body, the said water will pass between the closure and the body 14, the sieve 18 being provided at this portion and encircling the upper end of the strainer 16. After the coffee has been properly made and poured from the pot in the usual manner, the strainer 16, together with the body 14 can be removed from the pot by grasping the handle 15 and turning the body 14, thus disengaging the same from the pot.

Having thus fully described the invention, what I claim as new, is:—

1. A coffee percolator comprising a mesh bag serving as a receptacle for the coffee, a sieve connected at the mouth of the bag, an attaching ring connected with the free edge of the sieve, and a concavo-convexed non-perforated closure within the sieve for the mouth of the bag.

2. A coffee percolator for pots, including a mesh bag which provides a receptacle for the coffee, a sieve co-extensive with the bag from the mouth thereof, a ring secured to the outer edge of the sieve and adapted to engage with the pot at the top thereof to removably retain the percolator within the pot, a closure of concavo-convexed configuration for the mouth of the bag and adapted to serve as a directing member for directing a liquid poured within the pot and filtered through the strainer toward the inner wall of the pot and away from the bag.

3. A device of the class described including a mesh bag, a sieve of greater diameter than said bag disposed wholly above the same, the bottom of said sieve embracing the upper end of said bag and secured thereto, means connected with the upper portion of the sieve for detachably connecting the latter with a coffee pot, and an annular member, and a closure for said bag, said closure being pivotally connected to the upper surface of the annular member and disposed wholly within the sieve, thereby directing the fluid poured in said sieve in diverging streams through the latter and preventing the same from entering the bag in a non-filtered condition.

In testimony whereof I affix my signature in presence of two witnesses.

DUCHESS CAMINO.

Witnesses:
FRANK CAMINO,
LOUIS SAVARESE.

Copies of this patent may be obtained for five cents each, by addressing the "Commissioner of Patents, Washington, D. C."